June 12, 1951  F. NOE  2,556,551
ROLLER BEARING
Filed Aug. 31, 1948

INVENTOR
FRANK NOE
BY
ATTORNEYS

Patented June 12, 1951

2,556,551

UNITED STATES PATENT OFFICE 2,556,551

ROLLER BEARING

Frank Noe, Plainville, Conn., assignor to The Fafnir Bearing Company, New Britain, Conn., a corporation of Connecticut Application August 31, 1948, Serial No. 47,061

2 Claims. (Cl. 308—217)

My invention relates to an antifriction bearing and in particular to an improved cylindrical roller-bearing construction for heavy-duty applications, as in the mounting of railway axles.

In railway-type antifriction bearings utilizing cylindrical roller elements, retainer means are employed and these are made sometimes of steel; often, for heavy-duty applications, a one-piece cast-bronze retainer construction is preferred, due to its higher resistance to shock. Such retainer means is generally designed with open pockets to receive the rollers and with adequate side walls to hold them in proper axial position. Additional means may be employed for sustaining the thrust load of the bearing, but, in spite of the protection afforded by such means, the surface stresses of the rollers often force the rollers into thrust contact with the walls of the retainer pockets. In a period of scant lubrication, the ends of the rollers may wear into the side walls; and, if this wear is allowed to continue, there results a failure of the retaining means and a progressive failure of the complete bearing assembly. Wear may also take place between the outside faces of the side walls of the retaining means and the housing areas which limit axial displacement of the retaining means.

It is, accordingly, an object of my invention to provide an improved bearing construction of the character indicated.

It is another object to provide an improved bearing construction wherein retainer wear can be reduced to a minimum and wherein bearing life may thus be substantially prolonged.

It is also an object to provide improved thrust-sustaining means in a bearing of the character indicated.

It is a specific object to provide an improved bearing roller construction whereby bearing life may be extended.

Other objects and various further features of the invention will be specifically pointed out or will occur to those skilled in the art from the reading of the following specification in conjunction with the accompanying drawings. In said drawings, which show, for illustrative purposes only, a preferred form of the invention:

Figure 1:
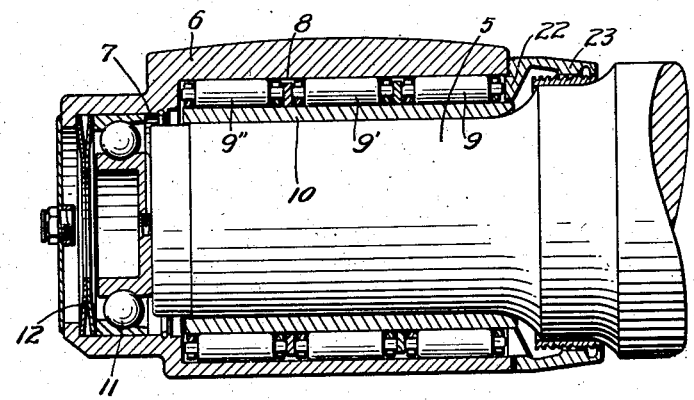
Fig. 1 is a vertical sectional view of an assembled bearing incorporating features of the invention.
Figure 2:
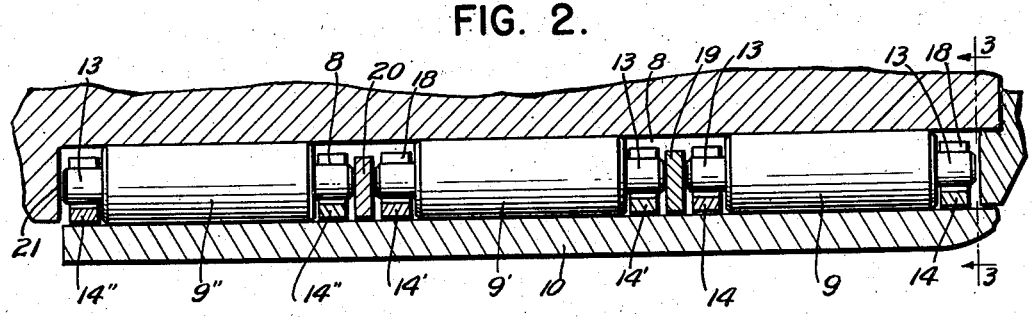
Fig. 2 is an enlarged fragmentary view of parts of the assembly of Fig. 1, also shown in a vertical section.
Figure 3:
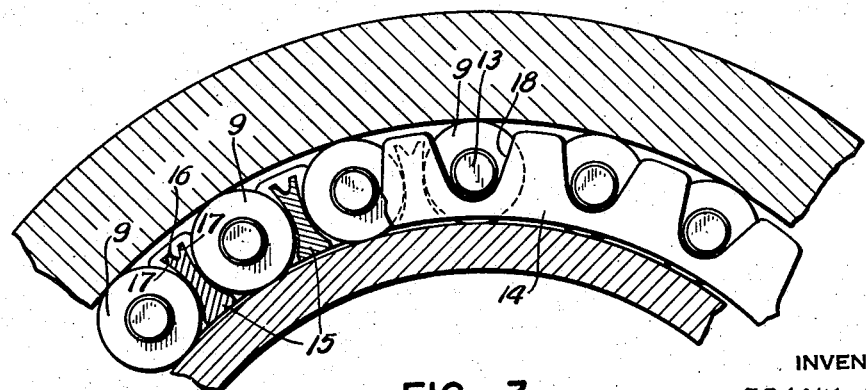
Fig. 3 is an enlarged fragmentary sectional view taken substantially in the plane 3—3 of Fig. 2.

Briefly stated, my invention contemplates improved means for axially retaining antifriction roller elements in a multiple-row bearing of the character indicated. The individual rollers may each be generally cylindrical and carry at each end an axial projection of reduced diameter. Suitable retainer means may be employed to retain the antifriction elements of a particular row as far as the circumferential spacing is concerned, but, in accordance with the invention, novel abutment means may be placed to intercept the projections of the rollers and thus to avert possibility of thrust engagement of the rollers with the retaining means. In the form to be described, a simple abutment ring of hardened material is placed between adjacent rows of roller elements, and suitably hardened shoulder means carried by the housing or outer race member may directly receive thrust loads via the outer projections of the outer roller elements of the assembly.

Referring to the drawings, my invention is shown in application to a heavy-duty multiple-row railway-type bearing suitable for the antifriction suspension of a railway axle 5. The antifriction bearing assembly may be carried as a unit within a housing 6, and the housing 6 may be of suitable shape to be accommodated within a conventional journal box (not shown). The inner surface of the housing member 6 may include a bore 7 and a counterbore 8, and the latter may be finished and serve as the outer raceway for rollers 9—9'—9'' of successive rows of a multiple-row radial bearing. For an inner raceway the rollers 9—9'—9'' may ride directly upon the axle, but in the form shown the inner race is provided by a sleeve member 19 slidably fitted upon the cylindrical end of the axle 5. In order to sustain thrust shocks and other loads, a thrust-type antifriction bearing 11 may be slidably received within the bore 7 and resiliently held against the end of the shaft 5 by means of oppositely dished frusto-conical washer means 12, in a manner more fully described in the co-pending patent application of H. R. Reynolds Serial No. 16,060, filed March 20, 1948.

In accordance with a feature of the invention, the roller elements 9—9'—9'' each carry or include an axially projecting portion 13 of reduced diameter at each end thereof, and these projections may serve to sustain whatever relatively slight thrust load may be imposed upon the roller elements. In the form shown, each set of rollers is nested within its own cage or retainer means 14—14'—14'', and such retainer means may comprise in each case a single-piece casting, which may be of bronze for heavy-duty applications. In the form shown, retainer means, such as the retainer 14 for the roller 9, includes a number of pockets defined by adjacent spacer webs 15 having a generally cupped shape. If desired, the outer lip or edge of the spacer web may be grooved, as at 16, so that after the adjacent rollers 9 have been inserted into the pockets, the lips 17 defined by the grooves 16 may be swaged sufficiently to retain the rollers 9 against a radially outward dislodgment. Both outer ends of the retainer 14 may include radially extending cutaway portions, as at 18, to permit the insertion of the projections 13 of the rollers 9. The depth of the cut-away portions 18 is such as to permit clearance at all times with the projections 13; yet the parts of the side wall that are not cut away are preferably relatively extensive so as to provide an extended area for axial locating abutment with the main body of the rollers 9.

As indicated, each set of rollers 9—9'—9" may have its own separate retainer 14—14'—14", and suitable abutment means may be employed to receive thrusting abutment with the projections 13 of the various rollers 9—9'—9". This abutment means may comprise rings such as the ring 19 between the sets of rollers 9—9'; the ring 19 may freely float between the raceways and present a flat radial surface for axial abutment with adjacent projections 13 of the rollers 9—9'. In like manner, a second freely floating abutment ring 20 may be interposed between the adjacent projections or rollers 9' and 9". Both rings 19 and 20 may be specially hardened to withstand incessant abutment.

To complete the assembly, a further ring similar to the rings 19—20 may be placed between the outer projections 13 of roller 9" and the shoulder 21 (formed between the bore 7 and the counterbore 8 of the housing member 6); but in the preferred form shown, no such additional ring need be employed, and the outer projections 13 of the outer rollers 9" may directly abut the shoulder 21. The shoulder 21 is preferably heat-treated, as when the outer raceway receives its heat treatment. In like manner, a further abutment ring may be interposed between the outer projection 13 of the roller 9 and the shoulder 22 on the dirt-and-water-seal member 23 of the assembly; again, in the form shown, there need be no such additional ring if the abutment 22 is heat-treated, as is preferred.

It will be appreciated that it is an important feature of my invention that the abutment means, such as rings 19—20, shall always be permitted to abut adjacent rollers, as at their projections 13, without requiring heavy thrusting abutment against inner side walls of the pockets of the retainer means 14—14'—14". This requirement may mean, of course, that the retainer means may have to be cut away; and, in the form shown, the size limitation is such that the projection 13 should extend axially beyond the outer limits of the retainer means.

It will be appreciated that I have described a novel roller-bearing construction which may provide substantially extended life, particularly in the case of heavy-duty applications. With my arrangement it is possible to employ relatively soft roller retainers, and at the same time hardened surfaces may receive all thrust impacts. It will be noted that because the thrusting abutments take place over the relatively small end area of the projections 13, there may be relatively little end wear of the rollers and of their projections 13, in view of the reduced surface speed that is characteristic of the reduced diameter.

While I have described my invention in detail for the preferred form shown, it will be understood that modifications may be made within the scope of the invention as defined in the claims which follow.

I claim:

1. Retainer means for an antifriction bearing having antifriction roller elements with axial projections of reduced diameter at each end thereof, said retainer means comprising an integral unitary annular ring including axially spaced end walls with a plurality of angularly spaced longitudinally extending webs between said end walls, whereby cupped pockets are provided for reception of the antifriction elements, said end walls having cut-away portions at the axial ends of said pockets, said cut-away portions being sufficiently large for clearance with the axial projections of the rollers to be received in said pockets.

2. In a roller bearing having spaced inner and outer raceways, two axially spaced antifriction roller assemblies, each said assembly including a plurality of rollers and a unitary retainer therefor, guide means on each said retainer for positive axially aligned guiding of said rollers, said rollers including at each end an axial projection of reduced diameter, said projections extending axially beyond both ends of said retainer, and a floating ring of hardened material between said assemblies, whereby each of said retainers may be wholly relied upon to maintain axial roller alignment to the exclusion of sustaining thrusts, while said ring may be wholly relied upon to sustain thrusts between said assemblies to the exclusion of thrusts or other forces due to axial misalignment of rollers.

FRANK NOE.

REFERENCES CITED

The following references are of record in the file of this patent:

UNITED STATES PATENTS

| Number | Name | Date |
| --- | --- | --- |
| 366,760 | Candee | July 19, 1887 |
| 844,373 | Leitch | Feb. 19, 1907 |
| 1,100,403 | Sharpneck | June 16, 1914 |
| 1,745,077 | Blume | Apr. 8, 1930 |
| 2,074,202 | Benedek | Mar. 16, 1937 |

FOREIGN PATENTS

| Number | Country | Date |
| --- | --- | --- |
| 79,696 | Sweden | Feb. 27, 1933 |